US010753251B2

(12) United States Patent
Barciela et al.

(10) Patent No.: US 10,753,251 B2
(45) Date of Patent: Aug. 25, 2020

(54) METHOD FOR OPERATING A GAS ENGINE

(71) Applicant: MAN TRUCK & BUS AG, München (DE)

(72) Inventors: Bruno Barciela, Nürnberg (DE); Martin McMackin, Nürnberg (DE)

(73) Assignee: MAN Truck & Bus AG, Munich (DE)

( * ) Notice: Subject to any disclaimer, the term of this patent is extended or adjusted under 35 U.S.C. 154(b) by 221 days.

(21) Appl. No.: 15/187,383

(22) Filed: Jun. 20, 2016

(65) Prior Publication Data

US 2016/0369678 A1    Dec. 22, 2016

(30) Foreign Application Priority Data

Jun. 20, 2015  (DE) .................. 10 2015 007 908

(51) Int. Cl.
*F01N 3/20*       (2006.01)
*F01N 13/00*      (2010.01)
(Continued)

(52) U.S. Cl.
CPC ......... *F01N 3/2066* (2013.01); *F01N 3/2073* (2013.01); *F01N 13/009* (2014.06);
(Continued)

(58) Field of Classification Search
CPC .... F01N 13/009; F01N 3/2066; F01N 3/2073; F01N 2430/10; F01N 2590/08;
(Continued)

(56) References Cited

U.S. PATENT DOCUMENTS 5,524,432 A * 6/1996  Hansel ............... B01D 53/8625
                                                    60/274
6,047,542 A * 4/2000  Kinugasa .......... B01D 53/8696
                                                    123/443
(Continued)

FOREIGN PATENT DOCUMENTS

CN      103696851       4/2014
DE      10359087        5/2005
(Continued)

OTHER PUBLICATIONS

Search Report dated Oct. 28, 2016 which issued in the corresponding European Patent Application No. 16001328.0.
(Continued)

*Primary Examiner* — Matthew T Largi
(74) *Attorney, Agent, or Firm* — Cozen O'Connor

(57) ABSTRACT

A method for operating a gas engine having an adjoining exhaust line through which exhaust line exhaust gas of the engine flows includes: operating the gas engine in accordance with a Miller cycle, such that a closing point of at least one intake valve of the gas engine is in a crank angle range of from about 50° of crank angle before bottom dead center (BDC) to about 10° of crank angle before BDC; and lowering, by at least one selective catalytic reduction (SCR) catalyst element in the exhaust line, a level of nitrogen oxides (NOx) in the exhaust gas flowing through the SCR catalyst element using hydrocarbons (CyHz) as a reducing agent. At least some of the hydrocarbons (CyHz) flowing through the SCR catalyst element are constituents of the exhaust gas of the gas engine.

13 Claims, 8 Drawing Sheets

(51) Int. Cl.
*F02D 19/02* (2006.01)
*F02D 13/02* (2006.01)

(52) U.S. Cl.
CPC ......... *F02D 13/0269* (2013.01); *F02D 19/02* (2013.01); *F01N 2430/10* (2013.01); *F01N 2590/08* (2013.01); *F01N 2590/10* (2013.01); *F01N 2610/03* (2013.01); *F01N 2610/06* (2013.01); *Y02A 50/2325* (2018.01); *Y02T 10/142* (2013.01); *Y02T 10/16* (2013.01); *Y02T 10/24* (2013.01); *Y02T 10/32* (2013.01)

(58) Field of Classification Search
CPC ............ F01N 2590/10; F01N 2610/03; F01N 2610/06; F02D 13/0269; F02D 19/02; Y02A 50/2325; Y02T 10/142; Y02T 10/16; Y02T 10/24; Y02T 10/32
See application file for complete search history.

(56) References Cited

U.S. PATENT DOCUMENTS

| | | | | |
|---|---|---|---|---|
| 6,470,682 | B2* | 10/2002 | Gray, Jr. | B01D 53/9495 123/698 |
| 7,263,824 | B2* | 9/2007 | Bellinger | F01N 3/0231 60/280 |
| 8,631,648 | B2* | 1/2014 | Lambert | F01N 3/103 60/274 |
| 2005/0229900 | A1* | 10/2005 | Weber | F01N 3/103 123/316 |
| 2005/0279333 | A1* | 12/2005 | Kweon | C01B 3/34 123/557 |
| 2006/0153761 | A1* | 7/2006 | Bandl-Konrad | B01D 53/9431 423/239.1 |
| 2008/0072575 | A1* | 3/2008 | Yan | F01N 3/0231 60/284 |
| 2009/0255236 | A1* | 10/2009 | Collier | B01D 53/9418 60/297 |
| 2010/0037597 | A1* | 2/2010 | Eckhoff | F01N 3/0814 60/286 |
| 2010/0154411 | A1* | 6/2010 | Bruck | F01N 3/023 60/598 |
| 2012/0227397 | A1* | 9/2012 | Willi | F02D 13/0269 60/605.1 |
| 2013/0276427 | A1* | 10/2013 | Doering | F01N 13/02 60/273 |
| 2014/0041637 | A1* | 2/2014 | Troberg | F02D 13/02 123/478 |
| 2014/0116050 | A1* | 5/2014 | Seo | F01K 3/00 60/659 |
| 2017/0268399 | A1* | 9/2017 | Doring | F01N 3/04 |

FOREIGN PATENT DOCUMENTS

| | | | |
|---|---|---|---|
| DE | 10359087 B3 | 5/2005 | |
| DE | 102004027593 A1 * | 12/2005 | ........... F01N 3/2053 |
| RU | 2403410 C2 | 11/2010 | |
| WO | WO 2012/021061 | 2/2012 | |

OTHER PUBLICATIONS

Search Report issued in Office Action dated Jul. 30, 2019 in Chinese Patent Application No. 201610440540.0, (3 pages).

* cited by examiner

METHOD FOR OPERATING A GAS ENGINE

BACKGROUND OF THE INVENTION

1. Field of the Invention

The invention relates to a method for operating a gas engine, in particular a stationary gas engine, to an apparatus having a gas engine, in particular a stationary gas engine, and to a vehicle, in particular a commercial vehicle, for carrying out the method and/or having the apparatus.

2. Description of the Related Art

The operation of a gas engine running on a carbon-containing fuel gas using a very lean fuel gas/air gas mixture (e.g., air/fuel ratio $\lambda=1.7$) is known. In this way, nitrogen oxides ($NO_x$) emitted by the gas engine are kept low. However, thermodynamic conditions dictate that a very lean mode of operation of the gas engine can result in a significant reduction in the efficiency of the gas engine. Moreover, it may be necessary in the case of a gas engine operated on a lean mixture to provide a nitrogen-oxide-reducing exhaust gas aftertreatment in an exhaust line adjoining the gas engine, e.g., if the nitrogen oxides ($NO_x$) emitted by the gas engine exceed the legal limits. The usual practice with an engine operated on a lean mixture is to use an active $NH_3$-SCR catalyst (Selective Catalytic Reduction) as an exhaust gas aftertreatment element for $NO_x$ reduction, by which the level of nitrogen oxides ($NO_x$) in the exhaust gas flowing through the SCR catalyst is lowered using ammonia ($NH_3$) as a reducing agent. Here, the ammonia is usually introduced into the exhaust line as an aqueous urea solution between the gas engine and the SCR catalyst, as viewed in the direction of flow of the exhaust gas, since the exhaust gas flowing directly out of the gas engine does not normally contain any ammonia. However, feeding in ammonia in this way is an involved process because of the provision of additional injectors, additional tanks and metering control (including sensors) and is expensive particularly because of the continuous consumption of ammonia.

Moreover, the practice of operating a gas engine running on a carbon-containing fuel gas in accordance with a Miller cycle is also known. In this Miller cycle, the intake valves of the gas engine are closed very early. As a result, the charge in a cylinder of the gas engine is initially expanded, resulting in a decrease in the temperature in a combustion chamber of the cylinder. A decrease in the temperature in the combustion chamber leads to a rise in the knock resistance of the gas engine. As a result, the compression ratio of the gas engine and thus the efficiency of the gas engine can be increased.

When using the Miller cycle, it is usually necessary to impose a high boost pressure on the combustion air fed to the gas engine or on the fuel gas/combustion air gas mixture fed to the gas engine. This high boost pressure or positive scavenging gradient across the combustion chamber leads to an increase in the slip of unburnt hydrocarbons ($C_yH_z$) in gas engines with external mixture formation, as a result of which a large quantity of hydrocarbons ($C_yH_z$) is emitted by the gas engine. This slip of unburnt hydrocarbons ($C_yH_z$) can be reduced by reducing the valve overlap (time during which both the intake valves and the exhaust valves of the gas engine are open). However, reducing the valve overlap generally causes a drop in the efficiency of the gas engine.

In summary, it can therefore be stated that a gas engine operated with a lean mixture and according to the Miller cycle cannot be operated at the maximum possible efficiency owing to the reduced valve overlap. Moreover, the use of an $NH_3$-SCR catalyst to lower the level of nitrogen oxides ($NO_x$) emitted by the combustion engine has the disadvantages already mentioned.

SUMMARY OF THE INVENTION

It is therefore an object of the invention to provide a method for operating a gas engine, in particular a stationary gas engine, and an apparatus having a gas engine, in particular a stationary gas engine, by which the gas engine can be operated with a high efficiency and the level of pollutants contained in the exhaust gas of the gas engine can be lowered in an effective and simple manner.

According to one aspect of the invention, a method for operating a gas engine, in particular a stationary gas engine, is proposed, wherein an exhaust line adjoining the gas engine, through which the exhaust gas of the gas engine flows, is provided, wherein the gas engine is operated with a lean fuel gas/air gas mixture, wherein the gas engine is operated in accordance with a Miller cycle, preferably in such a way that the closing point of the at least one intake valve of the gas engine is in a crank angle range of from about 50° of crank angle before BDC (bottom dead center) to about 10° of crank angle before BDC. According to the invention, the exhaust line has at least one SCR catalyst element, by which the level of nitrogen oxides ($NO_x$) in the exhaust gas flowing through or across the SCR catalyst element is lowered using hydrocarbons ($C_yH_z$) as a reducing agent, wherein at least some of the hydrocarbons ($C_yH_z$) flowing through the SCR catalyst element are constituents of the exhaust gas of the gas engine.

In this way, the gas engine can be operated with a particularly high efficiency since the unburnt hydrocarbons ($C_yH_z$) in the exhaust gas are now used as a reducing agent to lower the level of nitrogen oxides ($NO_x$) contained in the exhaust gas. As a result, the gas engine can be operated with a larger valve overlap, for example, allowing an increase in the efficiency of the gas engine. Moreover, the gas engine can also be operated with a richer fuel gas/air gas mixture, for example, whereby it is likewise possible to increase the efficiency of the gas engine. Furthermore, the gas engine can also be operated with an increased boost pressure, for example, which can likewise bring about an increase in the efficiency of the gas engine. In addition, the ignition point can also be advanced, whereby it is likewise possible to increase the efficiency of the gas engine. Moreover, the at least one intake valve of the gas engine can be closed earlier, whereby the efficiency of the gas engine can be increased. The increased quantity of emitted hydrocarbons ($C_yH_z$) as a result of the enlarged valve overlap and/or the richer fuel gas/air gas mixture and/or the increased boost pressure and/or the earlier ignition point and/or the earlier closing point of the intake valve is lowered again by the reaction of the emitted hydrocarbons ($C_yH_z$) with the nitrogen oxides ($NO_x$) contained in the exhaust gas. Furthermore, the level of pollutants contained in the exhaust gas is also lowered in a particularly simple and effective manner by the procedure according to the invention since there is now no need to introduce ammonia into the exhaust line to lower the level of nitrogen oxides ($NO_x$) contained in the exhaust gas. The lowering of the level of nitrogen oxides ($NO_x$) is now accomplished by the hydrocarbons ($C_yH_z$) already contained in the exhaust gas of the gas engine.

SCR catalyst elements by which the level of nitrogen oxides ($NO_x$) is lowered using hydrocarbons ($C_yH_z$) as a reducing agent are already known from the prior art. Here, the nitrogen oxides ($NO_x$) are generally converted in accordance with the following reaction equation:

$$2NO_x + C_yH_z + (y+z/4-x)O_2 \rightarrow N_2 + yCO_2 + (z/2)H_2O$$

(x=1 or 2)
With methane as the reducing agent, the reaction equation can be as follows, for example:

$$2NO + CH_4 + O_2 \rightarrow N_2 + CO_2 + 2H_2O$$

$$2NO_2 + CH_4 \rightarrow N_2 + CO_2 + 2H_2O$$

Parallel/secondary reactions in the SCR catalyst element and/or main reactions in an optionally provided oxidation catalyst element can be as follows, for example:

$$2NO + O_2 \leftrightarrow 2NO_2 \text{ (NO oxidation)}$$

$$C_yH_z + (y+z/4)O_2 \rightarrow yCO_2 + (z/2)H_2O \text{ ($C_yH_z$ oxidation in general)}$$

$$CH_4 + 2O_2 \rightarrow CO_2 + 2H_2O \text{ (methane oxidation)}$$

In a preferred procedure according to an aspect of the invention, the gas engine is operated with a fuel gas/air gas mixture that has an air/fuel ratio (lambda) of 1.2 to 1.6.

As a further preferred option, the ignition point of the gas engine is in a crank angle range of from 40° of crank angle before TDC (top dead center) to 10° of crank angle before TDC. As a particularly preferred option here, provision is made for the ignition point of the gas engine to be in a crank angle range of from 30° of crank angle before TDC to 15° of crank angle before TDC. By such an ignition point, the gas engine can be operated with a particularly high efficiency.

The closing point of the at least one intake valve of the gas engine is preferably in a crank angle range of from 45° of crank angle before BDC to 20° of crank angle before BDC. By this early closure of the at least one intake valve of the gas engine, the Miller cycle is optimized and the gas engine is operated with a particularly high efficiency.

In another preferred procedure, the valve overlap between the at least one intake valve of the gas engine and the at least one exhaust valve of the gas engine has a valve overlap value of from 0° of crank angle to 50° of crank angle, preferably a valve overlap value of from 30° of crank angle to 50° of crank angle. By a valve overlap value of from 30° of crank angle to 50° of crank angle, the gas engine can be operated with a particularly high efficiency and, in conjunction with the SCR catalyst, the level of pollutants contained in the exhaust gas of the gas engine can be lowered in a particularly effective manner.

The gas engine is preferably operated with a fuel gas that has a methane ($CH_4$) content greater than 40% by volume, preferably greater than 60% by volume, particularly preferably greater than 80% by volume. Provision is preferably made here for the fuel gas to be formed at least partially by natural gas and/or by biogas.

In a preferred embodiment, the exhaust line has at least one exhaust turbine of an exhaust turbocharger. Provision is preferably made here for the at least one SCR catalyst element to be arranged in or on the exhaust line upstream of the exhaust turbine, as viewed in the direction of flow of the exhaust gas. Such an arrangement is advantageous since the reaction of the hydrocarbons ($C_yH_z$) with the nitrogen oxides ($NO_x$) and oxygen ($O_2$) releases thermal energy and thus increases the enthalpy of the exhaust gas. By this increased enthalpy of the exhaust gas, the effectiveness or power density of the exhaust turbocharger is increased. Moreover, such an arrangement of the SCR catalyst element is advantageous if the exhaust gas pressure or the exhaust gas temperature downstream of the exhaust turbine is thereby more advantageous for achieving the desired conversion rate of nitrogen oxides ($NO_x$) and hydrocarbons ($C_yH_z$).

As an alternative and/or in addition, however, the at least one SCR catalyst element can also be arranged in or on the exhaust line downstream of the exhaust turbine, as viewed in the direction of flow of the exhaust gas. Such an arrangement is advantageous if the exhaust gas temperature upstream of the exhaust turbine represents an excessive thermal stress on the SCR catalyst element. Moreover, such an arrangement is also advantageous if the thermal energy released by the reactions taking place over the SCR catalyst element lead to a high thermal stress on the exhaust turbine. Furthermore, such an arrangement of the SCR catalyst element is advantageous if the exhaust gas pressure or the exhaust gas temperature downstream of the exhaust turbine is thereby more advantageous for achieving the desired conversion rate of nitrogen oxides ($NO_x$) and hydrocarbons ($C_yH_z$). (E.g. owing to the $NO_2/NO_x$ ratio, which is thermodynamically limited at high temperatures).

As a further preferred option, an energy recovery device is provided, by which useful energy can be recovered and/or generated from the thermal energy of the exhaust gas, wherein the energy recovery device has at least one heat-absorbing heat exchanger, by which the thermal energy of the exhaust gas can be absorbed. Provision is preferably made, in this case, for the at least one heat-absorbing heat exchanger to be arranged on or in the exhaust line downstream of the SCR catalyst element, as viewed in the direction of flow of the exhaust gas. This arrangement of the heat-absorbing heat exchanger is advantageous since it is thereby possible to use the increase in the enthalpy of the exhaust gas due to the SCR catalyst element to recover useful energy. Here, the useful energy can be in the form of hydraulic and/or pneumatic and/or electric and/or mechanical energy, for example. Energy recovery can be accomplished by a cyclical thermodynamic process.

The exhaust line preferably has at least one oxidation catalyst element. Provision is preferably made, in this case, for the at least one oxidation catalyst element to be arranged on or in the exhaust line upstream of the SCR catalyst element, as viewed in the direction of flow of the exhaust gas. Arranging the oxidation catalyst element upstream of the SCR catalyst element has the advantage that oxidation of nitric oxide (NO) to nitrogen dioxide ($NO_2$) is initially promoted by the oxidation catalyst element. As a result, the $NO_2/NO_x$ ratio of the exhaust gas flowing into the SCR catalyst element is increased, and the reduction of the nitrogen oxides ($NO_x$) by the SCR catalyst element is promoted. As a further preferred option, the oxidation catalyst element is arranged in or on the exhaust line upstream of the heat-absorbing heat exchanger of the energy recovery device, as viewed in the direction of flow of the exhaust gas, in order to use the increase in the enthalpy of the exhaust gas by the oxidation catalyst element to recover useful energy.

As an alternative and/or in addition, however, it is also possible for the at least one oxidation catalyst element to be arranged on or in the exhaust line downstream of the SCR catalyst element, as viewed in the direction of flow of the exhaust gas. By an oxidation catalyst element arranged downstream of the SCR catalyst element, hydrocarbons ($C_yH_z$) flowing downstream of the SCR catalyst element can be converted.

As a further preferred option, the SCR catalyst element and the oxidation catalyst element are formed by a single catalyst element in order to obtain a particularly compact construction. Provision is preferably made, in this case, for a substrate of the catalyst element to be coated with a catalyst material that has both a nitrogen-oxide-reducing and an oxidizing effect.

A substrate of the catalyst element preferably has at least one nitrogen-oxide reducing region, in that the substrate is coated with a nitrogen-oxide-reducing catalyst material, wherein the substrate has at least one oxidation region that adjoins the nitrogen-oxide-reducing region or is spaced apart from the nitrogen-oxide-reducing region and in which the substrate is coated with an oxidizing catalyst material.

As an alternative, the substrate of the catalyst element can also be coated with a plurality of catalyst material layers one above the other and/or one on top of the other, wherein at least one layer has a catalyst material with a nitrogen-oxide-reducing effect, and wherein at least one layer has a catalyst material with an oxidizing effect.

In another preferred embodiment, a delivery device, by which the fuel gas stored in a fuel tank is delivered into the exhaust line in a fuel-gas inlet region of the exhaust line, is provided, wherein the fuel-gas inlet region is arranged on the exhaust line downstream of an exhaust-gas inflow region, at which the exhaust gas of the gas engine flows into the exhaust line, and upstream of the SCR catalyst element, as viewed in the direction of flow of the exhaust gas. By a delivery device of this kind, hydrocarbons ($C_yH_z$), for example, can be introduced into the exhaust line when the quantity of hydrocarbons ($C_yH_z$) contained in the exhaust gas of the gas engine is too small to lower the level of nitrogen oxides contained in the exhaust gas in an effective or adequate manner. In this context, a closed-loop and/or open-loop control device is preferably provided, by which the quantity of fuel gas delivered by the delivery device is subjected to closed-loop and/or open-loop control. By the closed-loop and/or open-loop control device, the quantity of fuel gas delivered by the delivery device is preferably subjected to closed-loop and/or open-loop control in such a way that the nitrogen oxides contained in the exhaust gas are always held below a defined nitrogen oxide limit, irrespective of the way in which the gas engine is operated. Here, the defined nitrogen oxide limit can be determined by exhaust regulations, for example. Closed-loop control of this kind is advantageous especially in the case of gas engines that are operated over a wide operating point map. Gas engines of this kind are generally provided on a vehicle.

As a further preferred option, the catalyst material of the SCR catalyst element contains silver and/or copper and/or platinum and/or indium and/or $CeO_2$ and/or cobalt and/or palladium as the active component. By active components of this kind, the level of nitrogen oxides contained in the exhaust gas can be reduced in a particularly effective manner, especially with methane as the reducing agent. As a further preferred option, the catalyst material of the SCR catalyst element contains $Al_2O_3$ and/or $TiO_2$ and/or $SiO_2$ and/or $ZrO_2$ as a supporting component. As an alternative and/or in addition, the catalyst material of the SCR catalyst element can also contain a zeolite and/or a modified zeolite (modified by ion exchange and/or by the introduction of metal particles, for example).

As a particularly preferred option, a catalyst material layer of the SCR catalyst element is composed at least in part of $Ag$—$Al_2O_3$, preferably of $Ag$—$Al_2O_3$ containing 1 to 3% by weight of Ag. With such a composition of the catalyst material, a particularly high conversion rate of the nitrogen oxides contained in the exhaust gas is achieved. In particular, a high conversion rate of the nitrogen oxides is achieved by a catalyst material of this kind, even if relatively large quantities of water are present. As an alternative and/or in addition, a catalyst material layer of the SCR catalyst element can be composed at least in part of Pt/In-ZSM-5 or of CeO2-In-ZSM and/or of Co-ZSM-5. By catalyst material layers formed in this way, a high conversion rate of the nitrogen oxides contained in the exhaust gas is likewise achieved. As a further alternative and/or additional measure, a catalyst material layer of the SCR catalyst element can be composed at least in part of $Cu$—$Al_2O_3$, preferably of $Cu$—$Al_2O_3$ containing 6 to 10% by weight of Cu. Furthermore, a catalyst material layer of the SCR catalyst element can be composed at least in part of $Pd$—$ZrO_2$, preferably of $Pd$—$ZrO_2$ containing 0.1 to 0.5% by weight of Pd.

To achieve the object already mentioned, in accordance with another aspect of the invention, an apparatus is provided having a gas engine, in particular a stationary gas engine, with an exhaust line adjoining the gas engine, through which the exhaust gas of the gas engine flows, wherein the gas engine can be operated with a lean fuel gas/air gas mixture, wherein the gas engine can be operated in accordance with a Miller cycle, preferably in such a way that the closing point of the at least one intake valve of the gas engine is in a crank angle range of from about 50° of crank angle before BDC (bottom dead center) to about 10° of crank angle before BDC. According to the invention, the exhaust line has at least one SCR catalyst element, by which the level of nitrogen oxides ($NO_x$) in the exhaust gas flowing through or via the SCR catalyst element can be lowered using hydrocarbons ($C_yH_z$) as a reducing agent, wherein at least some of the hydrocarbons ($C_yH_z$) flowing through the SCR catalyst element are constituents of the exhaust gas of the gas engine.

The advantages obtained by the apparatus according to this aspect of the invention are identical with the already acknowledged advantages of the procedure set forth above, and therefore these are not repeated at this point.

In another aspect, a stationary cogeneration unit and/or a vehicle, in particular a commercial vehicle, for carrying out the above described method and/or with the above described apparatus is/are provided. The resulting advantages are likewise identical with the already acknowledged advantages of the above-described procedure, and therefore these are likewise not repeated here.

The advantageous embodiments and/or developments of the invention which are explained above and/or described in the claims can be used either singly or in any desired combination, except, for example, in cases of clear dependence or irreconcilable alternatives.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and the advantageous embodiments and/or developments thereof and the advantages thereof are explained in greater detail below, purely by way of example, by drawings, in which.

DETAILED DESCRIPTION OF THE PRESENTLY PREFERRED EMBODIMENTS

Figure 1:
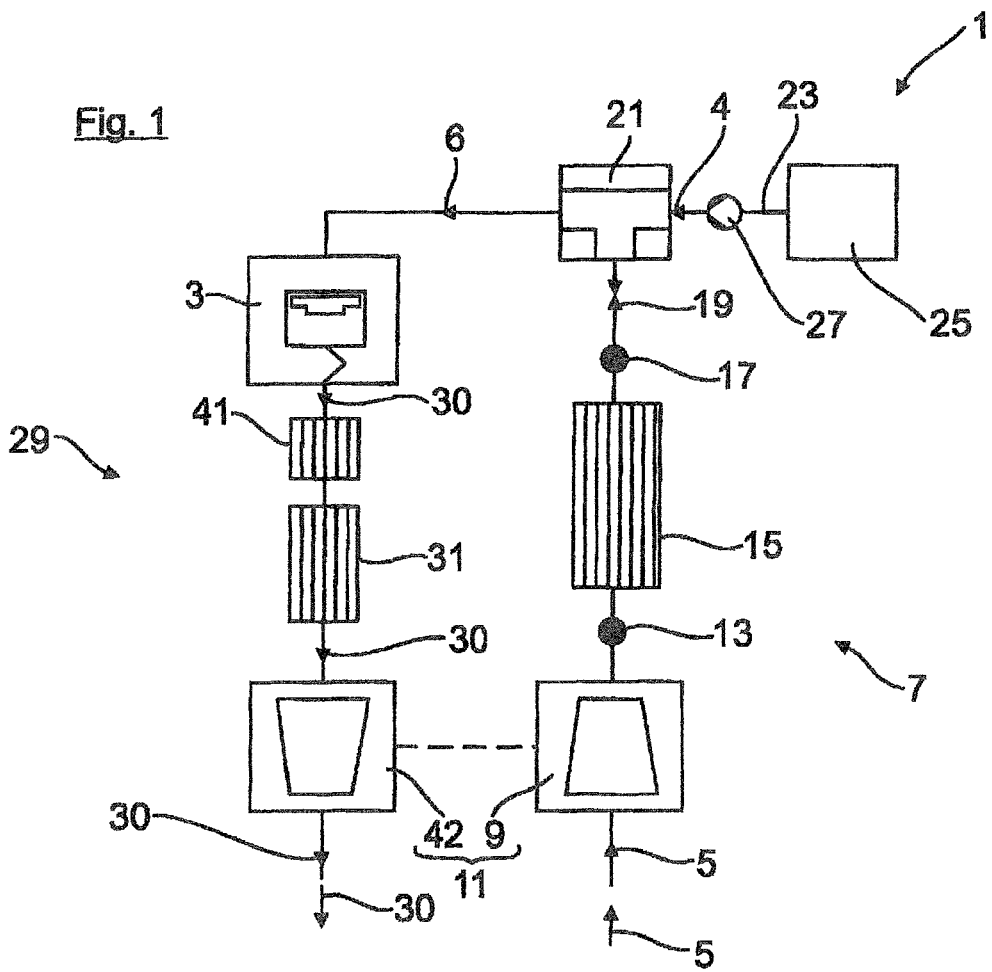
FIG. 1 shows the construction of a first embodiment of an apparatus according to the invention in a schematic illustration.

The construction of a first embodiment of an apparatus according to the invention is shown in FIG. 1. The apparatus 1 has a gas engine 3, which is operated with a carbon-containing fuel gas 4 as fuel. The fuel gas 4 preferably has a methane content ($CH_4$) greater than 80% and can be formed by natural gas, for example. The fuel gas/combustion air gas mixture 6 is here formed outside the gas engine 3 or externally, for example.

As is evident from FIG. 1, combustion air 5 flows into an intake tract 7 of the apparatus 1 during the operation of the gas engine 3. As viewed in the direction of flow of the combustion air, the intake tract 7 has a compressor 9 of an exhaust turbocharger 11, a pressure sensor 13, a charge air cooler 15, a pressure sensor 17, a throttle valve 19 and a fuel gas/combustion air mixing device 21. Here, by way of example, the fuel gas/combustion air mixing device 21 has connected to it a feed line 23, by which the fuel gas 4 stored in a fuel tank 25 of the apparatus 1 is fed into the fuel gas/combustion air mixing device 21. Here, by way of example, the fuel gas 4 is delivered towards the fuel gas/combustion air mixing device 21, starting from the fuel tank 25, by a pump 27.

According to FIG. 1, the apparatus 1 also has an exhaust line 29, through which an exhaust gas 30 of the gas engine 3 flows. The exhaust line 29 has an SCR catalyst element 31, by which the level of nitrogen oxides ($NO_x$) in the exhaust gas flowing through the SCR catalyst element 31 is lowered using hydrocarbons ($C_yH_z$) as a reducing agent. Here, the hydrocarbons flowing through the SCR catalyst element 31 are a constituent of the exhaust gas 30 of the gas engine 3.

Figure 2:
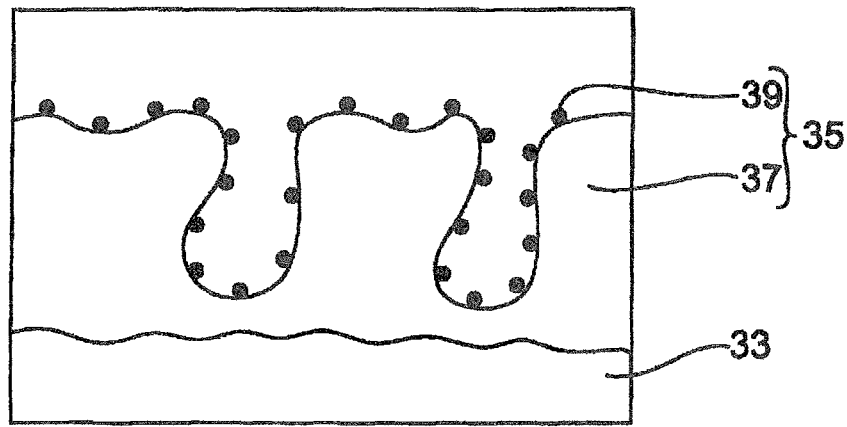
FIG. 2 shows the construction of an SCR catalyst element in the apparatus in a schematic illustration.

In FIG. 2, the construction of the SCR catalyst element 31 is shown schematically. The SCR catalyst element 31 has a substrate 33, which is coated with a catalyst material 35. The catalyst material or catalyst material layer 35 has a supporting component 37 and an active component 39. As an active component 39, the catalyst material 39 preferably contains silver and/or copper and/or platinum and/or indium and/or $CeO_2$ and/or cobalt and/or palladium. As a supporting component 37, the catalyst material 35 preferably contains $Al_2O_3$ and/or $TiO_2$ and/or $SiO_2$ and/or $ZrO_2$. As an alternative and/or in addition, the catalyst material 39 can also have a zeolite and/or a modified zeolite.

According to FIG. 1, by way of example, the exhaust line 29 also has an oxidation catalyst element 41 arranged between the gas engine 3 and the SCR catalyst element 31, as viewed in the direction of flow of the exhaust gas. Here, by way of example, an exhaust turbine 42 of the exhaust turbocharger 11 is furthermore arranged in or on the exhaust line 29 downstream of the SCR catalyst element 31, as viewed in the direction of flow of the exhaust gas.

Here, by way of example, the gas engine 3 is furthermore operated with a fuel gas/air gas mixture that has an air/fuel ratio (lambda) of 1.2 to 1.6. Here, by way of example, the ignition point of the gas engine 3 is moreover in a crank angle range of from 40° of crank angle before TDC (top dead center) to 10° of crank angle before TDC. Here, by way of example, the closing point of the intake valves of the gas engine 3, of which there are two here by way of example, is furthermore in a crank angle range of from 50° of crank angle before BDC (bottom dead center) to 10° of crank angle before BDC. Here, by way of example, the valve overlap of the intake valves of the gas engine 3 and of the exhaust valves of the gas engine 3, of which there are two here by way of example, furthermore has a valve overlap value of from 0° to 50° of crank angle. By operating the gas engine 3 in this way, in combination with the SCR catalyst element 31 of the exhaust line 29, a particularly high efficiency of the gas engine 3 and effective reduction of the pollutants contained in the exhaust gas of the gas engine 3 are achieved.

Figure 3:
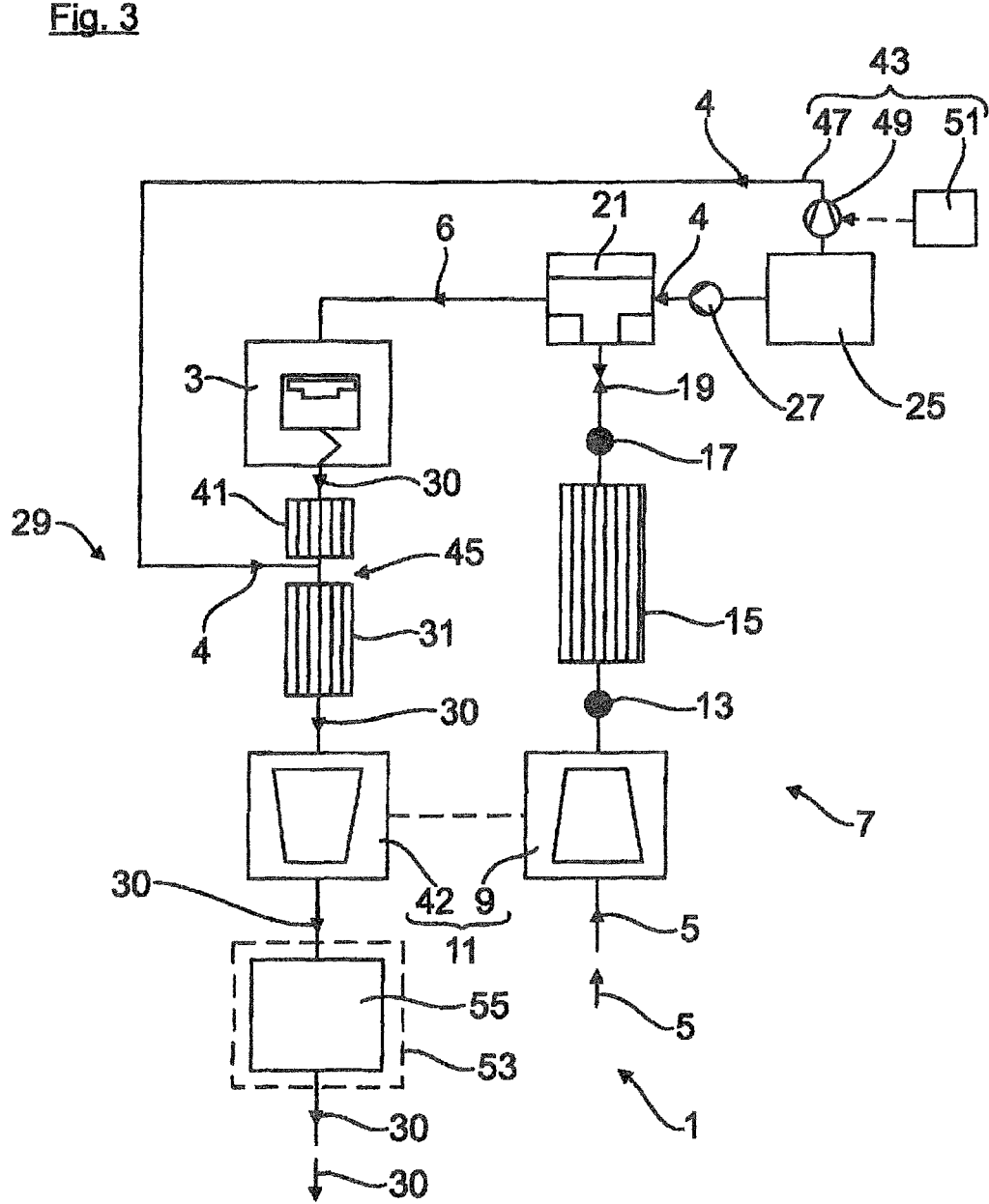
FIG. 3 shows a second embodiment of the apparatus in an illustration according to FIG. 1.

A second embodiment of the apparatus 1 is shown in FIG. 3. In contrast to the first embodiment shown in FIG. 1, the second embodiment of the apparatus 1 has a delivery device 43, by which the fuel gas 4 stored in the fuel tank 25 can be delivered into the exhaust line 29 in a fuel-gas inlet region 45 of the exhaust line 29. Here, by way of example, the fuel-gas inlet region 45 of the exhaust line 29 is arranged between the oxidation catalyst element 41 and the SCR catalyst element 31, as viewed in the direction of flow of the exhaust gas. Here, by way of example, the delivery device 43 has a connecting line 47, by which the fuel tank 25 and the exhaust line 29 are connected to one another in terms of flow. Here, by way of example, the delivery device 43 also has a pump 49, by which the fuel gas 4 is delivered through the connecting line 47. Here, by way of example, the pump 49 is subjected to closed-loop and/or open-loop control by a closed-loop and/or open-loop control device 51 of the delivery device 43. Here, by way of example, fuel gas 4 is delivered into the exhaust line 29 by the delivery device 43 when the hydrocarbons contained in the exhaust gas 30 of the gas engine 3 are not sufficient to reduce the nitrogen oxides in the exhaust gas 30 to the required extent. Thus, a high conversion rate of the nitrogen oxides contained in the exhaust gas 30 is reliably ensured by the delivery device 30.

As is furthermore shown in FIG. 3, the second embodiment of the apparatus 1 furthermore also has an energy recovery device 53, by which useful energy can be recovered or generated from the thermal energy of the exhaust gas 30. Here, the recovery of the energy can be accomplished by a cyclical thermodynamic process for example, e.g., by the Clausius-Rankine cycle. The energy recovery device 53 has a heat-absorbing heat exchanger 55, by which the thermal energy of the exhaust gas 30 is absorbed. Here, by way of example, the heat-absorbing heat exchanger 55 is arranged in or on the exhaust line 29 downstream of the exhaust turbine 42 of the exhaust turbocharger 11, as viewed in the direction of flow of the exhaust gas.

Figure 4:
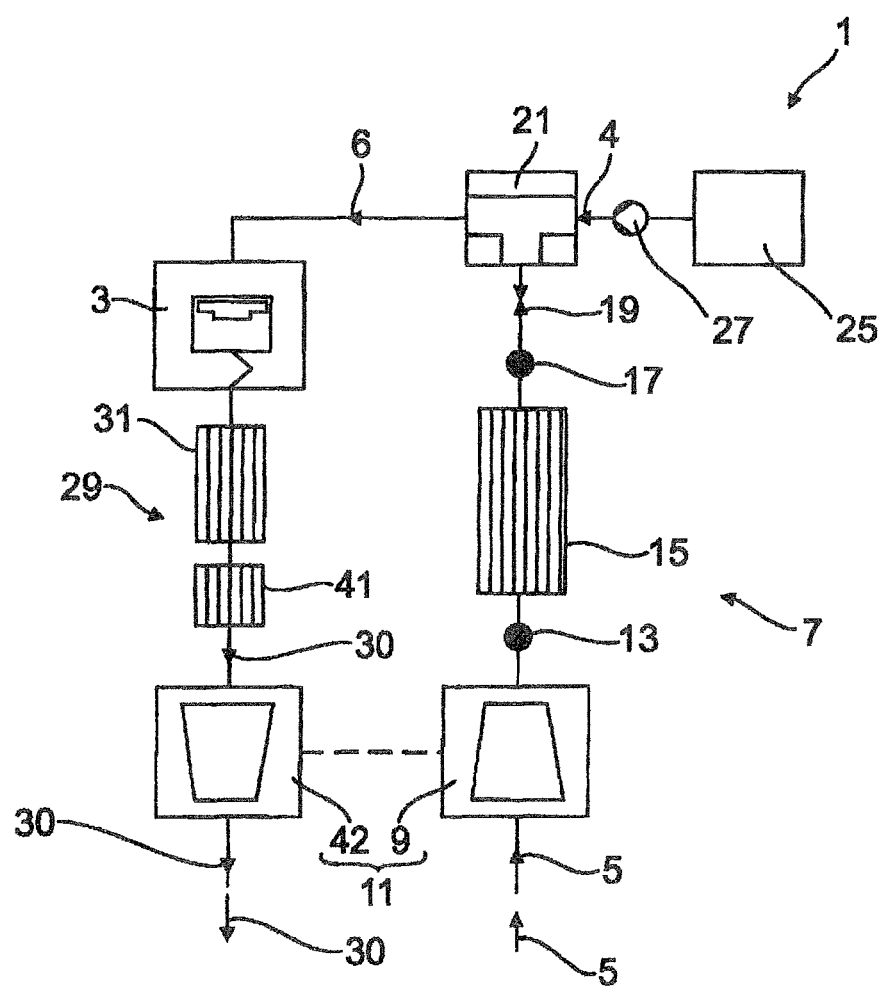
FIG. 4 shows a third embodiment of the apparatus in an illustration according to FIG. 1.

A third embodiment of the apparatus 1 is shown in FIG. 4. In comparison with the first embodiment shown in FIG. 1, the oxidation catalyst 41 is here arranged in or on the exhaust line 29 downstream of the SCR catalyst element 31, as viewed in the direction of flow of the exhaust gas.

Figure 5:
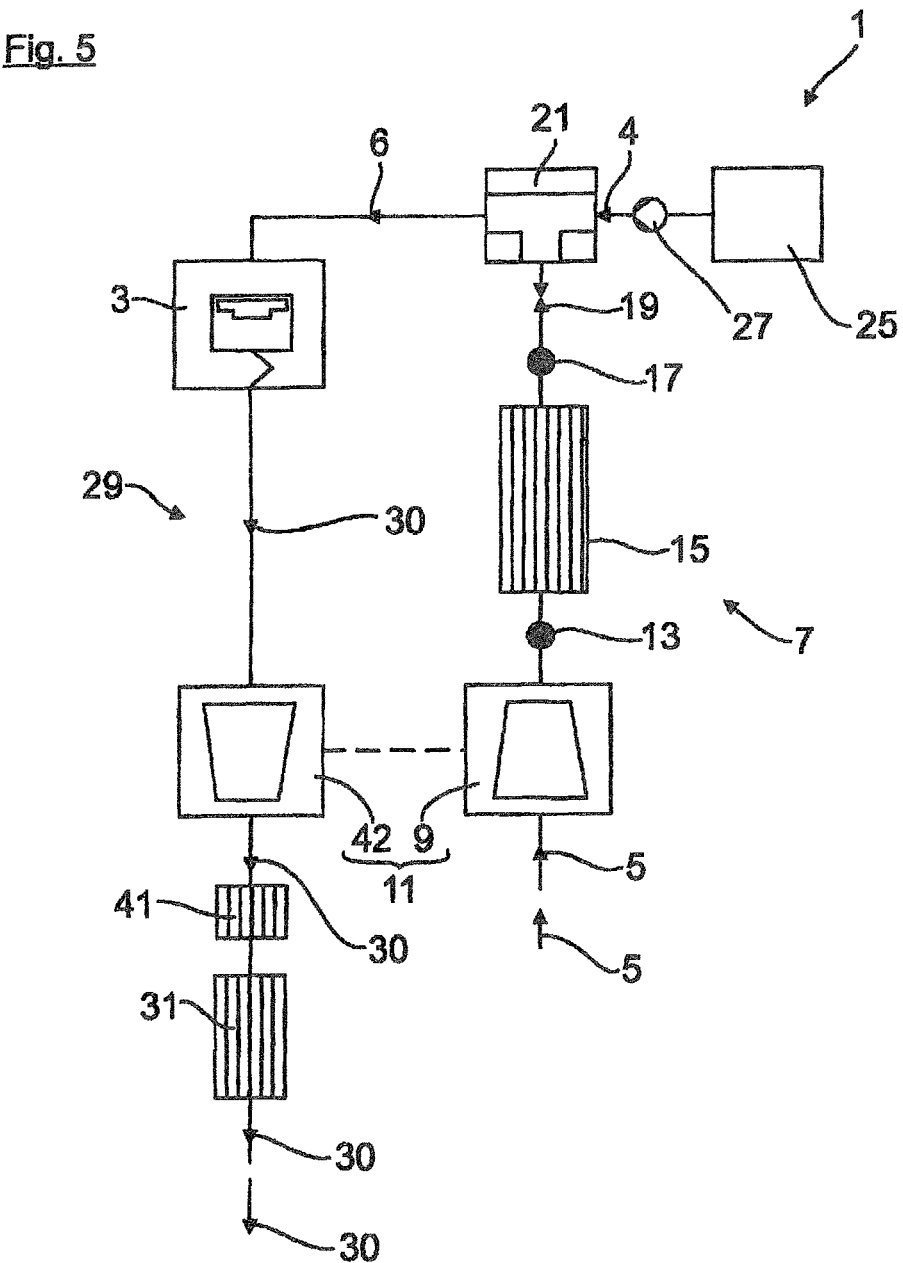
FIG. 5 shows a fourth embodiment of the apparatus in an illustration according to FIG. 1

A fourth embodiment of the apparatus 1 is shown in FIG. 5. In comparison with the first embodiment shown in FIG. 1, the SCR catalyst element 31 and the oxidation catalyst element 41 are here arranged in or on the exhaust line 29 downstream of the exhaust turbine 42 of the exhaust turbocharger, as viewed in the direction of flow of the exhaust gas.

Figure 6:
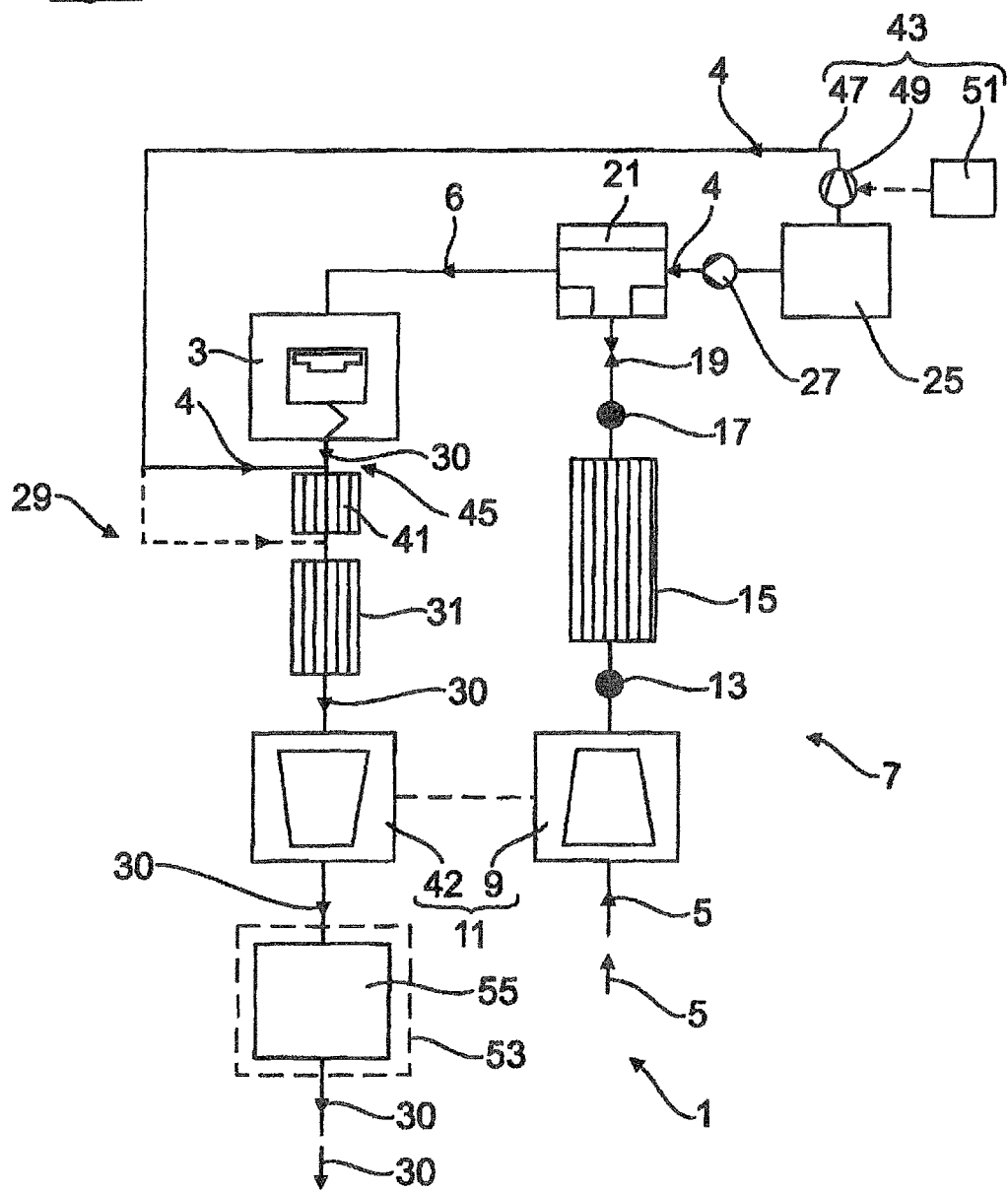
FIG. 6 shows a fifth embodiment of the apparatus in an illustration according to FIG. 1.

A fifth embodiment of the apparatus 1 is shown in FIG. 6. In comparison with the second embodiment shown in FIG. 3, the fuel-gas inlet region 45 of the exhaust line 29 is here arranged between the gas engine 3 and the oxidation catalyst element 41, as viewed in the direction of flow of the exhaust gas. As indicated by dashed lines in FIG. 6, the fuel gas 4 could additionally also be introduced into the exhaust line 29 between the oxidation catalyst element 41 and the SCR catalyst element 31, as viewed in the direction of flow of the exhaust gas, by the delivery device 43.

Figure 7:
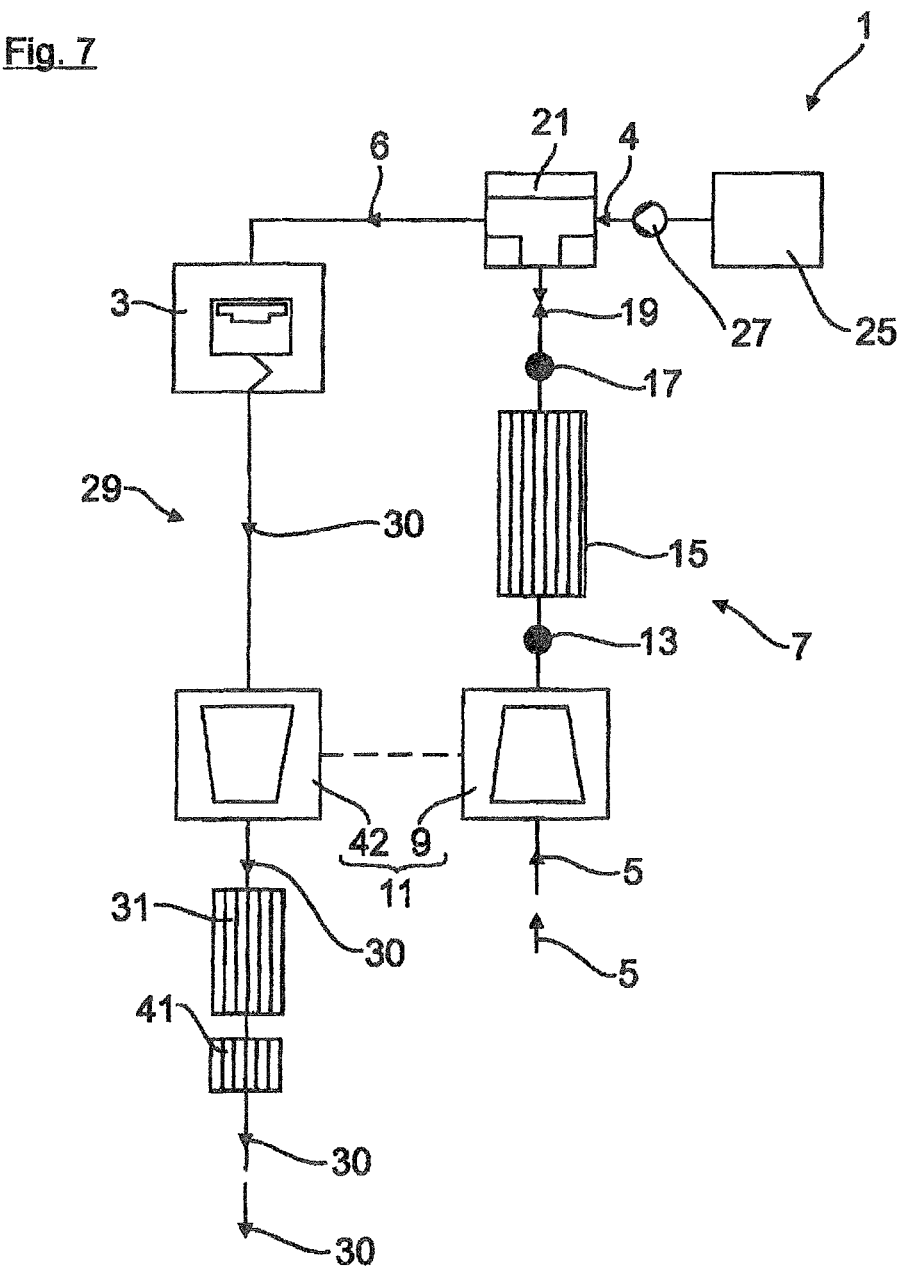
FIG. 7 shows a sixth embodiment of the apparatus in an illustration according to FIG. 1.

A sixth embodiment of the apparatus 1 is shown in FIG. 7. In comparison with the fourth embodiment shown in FIG. 5, the oxidation catalyst element 41 is here arranged in or on the exhaust line 29 downstream of the SCR catalyst element 31, as viewed in the direction of flow of the exhaust gas.

Figure 8:
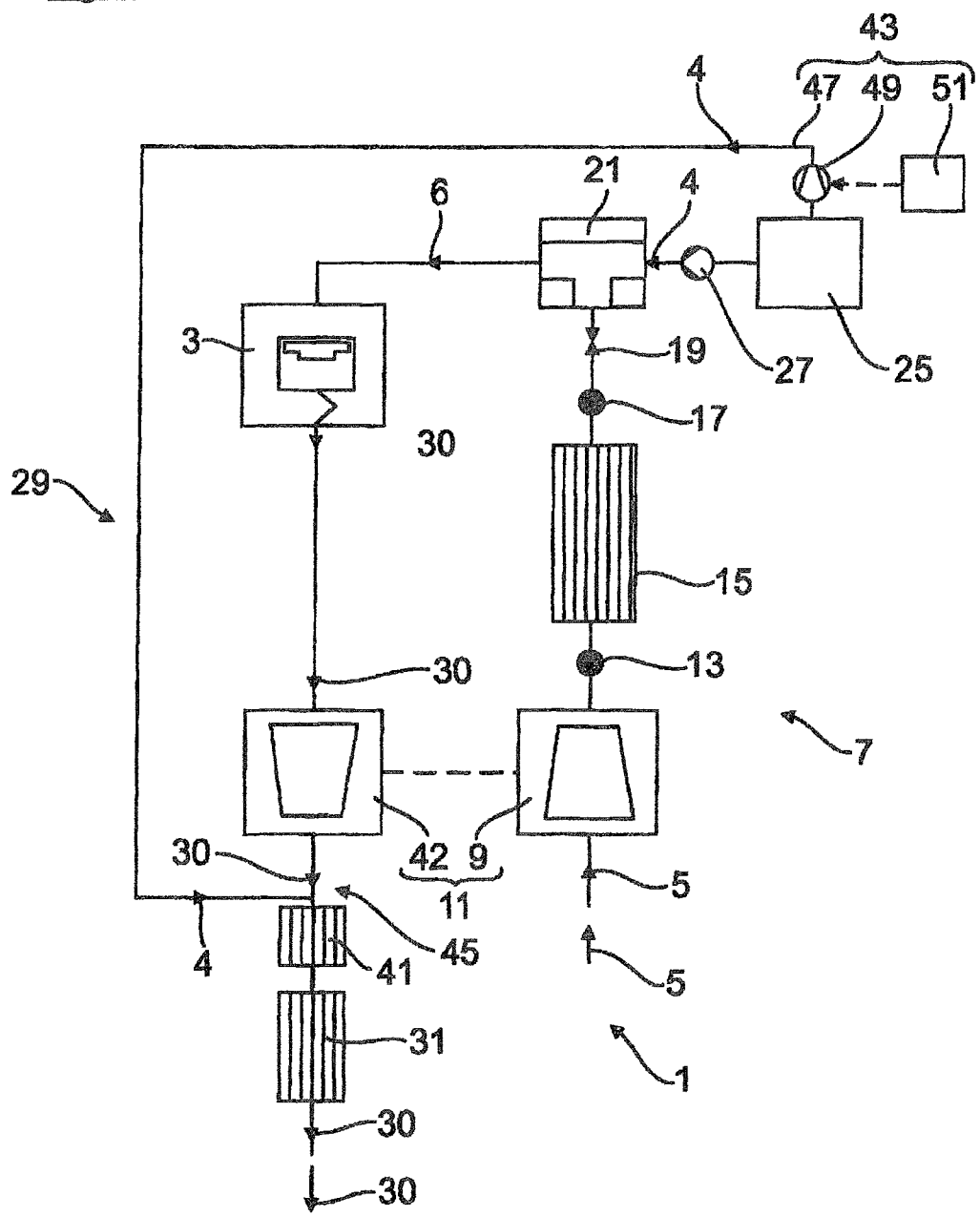
FIG. 8 shows a seventh embodiment of the apparatus in an illustration according to FIG. 1.

A seventh embodiment of the apparatus 1 is shown in FIG. 8. In comparison with the fourth embodiment shown in FIG. 5, the apparatus 1 here additionally has the delivery device 43. Here, by way of example, the exhaust gas inlet region 45 is arranged between the exhaust turbine 42 and the oxidation catalyst element 41, as viewed in the direction of flow of the exhaust gas.

Figure 9:
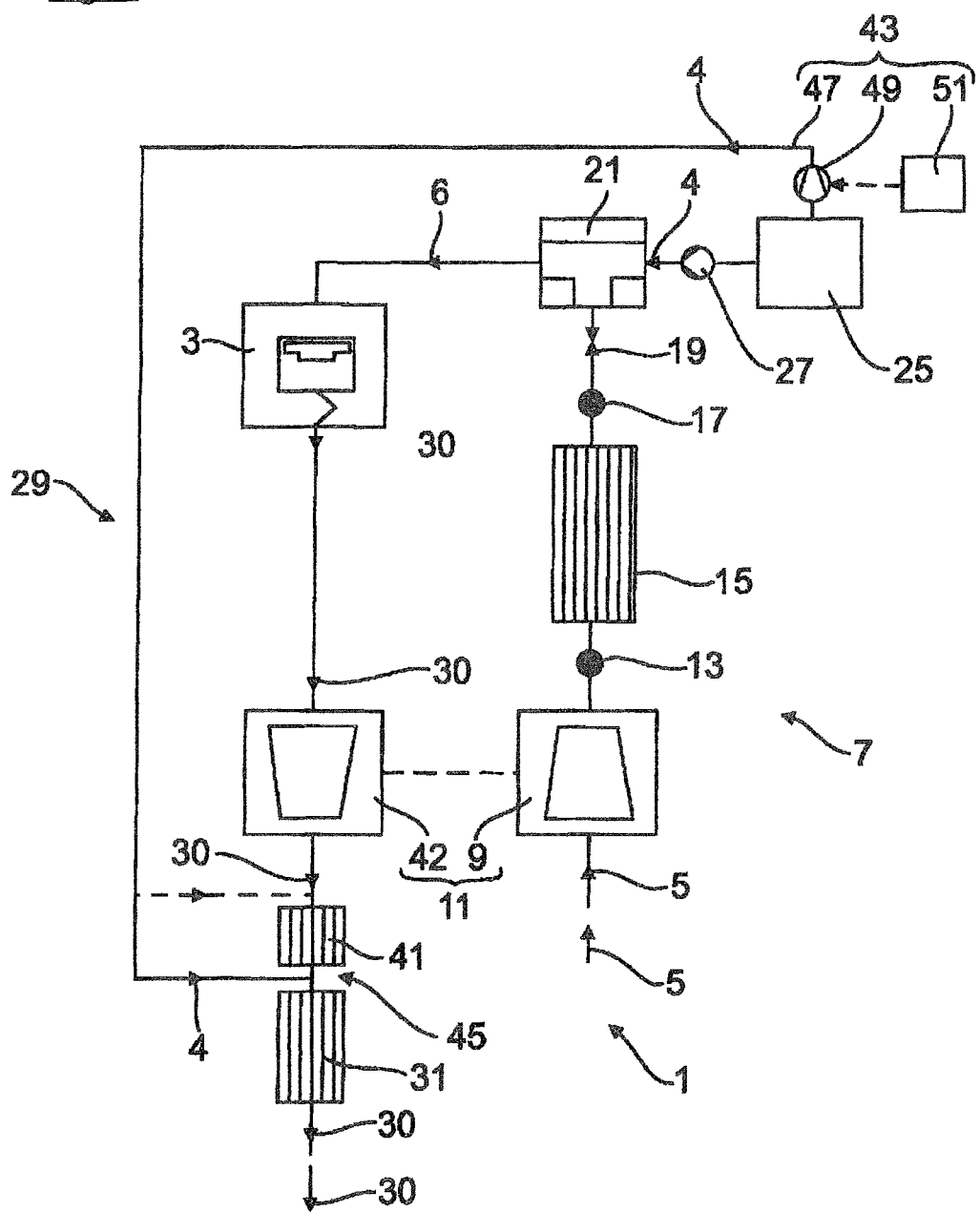
FIG. 9 shows an eighth embodiment of the apparatus in an illustration according to FIG. 1.

An eighth embodiment of the apparatus 1 is shown in FIG. 9. In comparison with the seventh embodiment shown in FIG. 8, the fuel-gas inlet region 45 of the exhaust line 29 is here arranged between the oxidation catalyst element 41 and the SCR catalyst element 31, as viewed in the direction of flow of the exhaust gas. As indicated by dashed lines in FIG. 9, the fuel gas 4 could additionally also be introduced into the exhaust line 29 between the exhaust turbine 42 and the oxidation catalyst element 41, as viewed in the direction of flow of the exhaust gas, by means of the delivery device 43.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE SIGNS 1 apparatus
3 gas engine
4 fuel gas
5 combustion air
6 fuel gas/combustion air gas mixture
7 intake tract
9 compressor
11 exhaust turbocharger
13 pressure sensor
15 charge air cooler
17 pressure sensor
19 throttle valve
21 fuel gas/combustion air mixing device
23 feed line
25 fuel tank
27 pump
29 exhaust line
30 exhaust gas
31 SCR catalyst element
33 substrate
35 catalyst material
37 supporting component
39 active component
41 oxidation catalyst element
42 exhaust turbine
43 delivery device
45 fuel gas inlet region
47 delivery line
49 pump
51 closed-loop and/or open-loop control device
53 energy recovery device
55 heat absorbing heat exchanger

What is claimed is:

1. A method for operating a gas engine with external mixture formation having an adjoining exhaust line (29) through which exhaust line (29) exhaust gas (30) of the gas engine (3) flows, the gas engine (3) being operable with a lean fuel gas/air gas mixture (6), the method comprising:
operating the gas engine (3) in accordance with a Miller cycle, such that a closing point of at least one intake valve of the gas engine (3) is in a crank angle range of from about 50° of crank angle before bottom dead center (BDC) to about 10° of crank angle before BDC; and
lowering, by at least one selective catalytic reduction (SCR) catalyst element (31) in the exhaust line (29), a level of nitrogen oxides ($NO_x$) in the exhaust gas (30) flowing through the at least one SCR catalyst element (31) using hydrocarbons ($C_yH_z$) as a reducing agent,
wherein at least some of the hydrocarbons ($C_yH_z$) flowing through the at least one SCR catalyst element (31) are constituents of the exhaust gas (30) of the gas engine (3),
wherein an ignition point of the gas engine (3) is in a crank angle range of from 30° of crank angle before top dead center (TDC) to 15° of crank angle before TDC,
wherein the exhaust line (29) has at least one exhaust turbine (42) of an exhaust turbocharger (11), wherein the at least one SCR catalyst element (31) is arranged on or in the exhaust line (29) upstream of the at least one exhaust turbine (42), as viewed in a direction of flow of the exhaust gas,
wherein the exhaust line (29) has at least one oxidation catalyst element (41), and
wherein the at least one SCR catalyst element (31) and the at least one oxidation catalyst element (41) are formed by a single catalyst element, wherein a substrate of the single catalyst element is coated with a catalyst material which has both a nitrogen-oxide-reducing and an oxidizing effect.

2. The method according to claim 1, wherein the gas engine (3) is operated with the lean fuel gas/air gas mixture (6) having an air/fuel ratio (lambda) of 1.2 to 1.6.

3. The method according to claim 1, wherein the closing point of the at least one intake valve of the gas engine (3) is in the crank angle range of from 45° of crank angle before BDC to 20° of crank angle before BDC.

4. The method according to claim 1, wherein a valve overlap between the at least one intake valve of the gas engine (3) and at least one exhaust valve of the gas engine (3) has a valve overlap value of from 0° of crank angle to 50° of crank angle.

5. The method according to claim 1, wherein the gas engine (3) is operated with a fuel gas (4) having a methane content ($CH_4$) greater than 40% by volume, wherein the fuel gas (4) is formed at least partially by natural gas and/or by biogas.

6. The method according to claim 5, further comprising:
delivering, by a delivery device (43), the fuel gas (4) stored in a fuel tank (25) into the exhaust line (29) in a fuel-gas inlet region (45) of the exhaust line (29), wherein the fuel-gas inlet region (45) is arranged on the exhaust line (29) downstream of an exhaust-gas inflow region, at which the exhaust gas (30) of the gas engine (3) flows into the exhaust line (29), and upstream of the at least one SCR catalyst element (31), as viewed in the direction of flow of the exhaust gas; and
subjecting, by a closed-loop and/or open-loop control device (51), a quantity of fuel gas (4) delivered by the delivery device (43) to closed-loop and/or open-loop control.

7. The method according to claim 1, further comprising recovering and/or generating, by an energy recovery device (53), useful energy from thermal energy of the exhaust gas (30), wherein the energy recovery device (53) has at least one heat-absorbing heat exchanger (55) by which the thermal energy of the exhaust gas (30) can be absorbed, wherein the at least one heat-absorbing heat exchanger (55) is arranged on or in the exhaust line (29) downstream of the at least one SCR catalyst element (31), as viewed in the direction of flow of the exhaust gas.

8. A stationary cogeneration unit and/or vehicle configured to carry out the method according to claim 1.

9. The method according to claim 1, wherein a valve overlap between the at least one intake valve of the gas engine (3) and at least one exhaust valve of the gas engine (3) has a valve overlap value of from 30° of crank angle to 50° of crank angle.

10. The method according to claim 1, wherein the gas engine (3) is operated with a fuel gas (4) having a methane content ($CH_4$) greater than 60% by volume, wherein the fuel gas (4) is formed at least partially by natural gas and/or by biogas.

11. The method according to claim 1, wherein the gas engine (3) is operated with a fuel gas (4) having a methane content ($CH_4$) greater than 80% by volume, wherein the fuel gas (4) is formed at least partially by natural gas and/or by biogas.

12. An apparatus, comprising:
a gas engine (3) with external mixture formation; and
an exhaust line (29) adjoining the gas engine (3), through which exhaust gas (30) of the gas engine (3) flows, the gas engine (3) being operable with a lean fuel gas/air gas mixture,
wherein:
the gas engine (3) is operable in accordance with a Miller cycle such that the closing point of at least one intake valve of the gas engine (3) is in a crank angle range of from about 50° of crank angle before bottom dead center (BDC) to about 10° of crank angle before BDC,
the exhaust line (29) has at least one selective catalytic reduction (SCR) catalyst element (31) configured to lower a level of nitrogen oxides (NOx) in the exhaust gas (30) flowing through the at least one SCR catalyst element (31) using hydrocarbons ($C_xH_z$) as a reducing agent,
at least some of the hydrocarbons ($C_yH_z$) flowing through the at least one SCR catalyst element (31) are constituents of the exhaust gas (30) of the gas engine (3),
wherein an ignition point of the gas engine (3) is in a crank angle range of from 30° of crank angle before top dead center (TDC) to 15° of crank angle before TDC,
wherein the exhaust line (29) has at least one exhaust turbine (42) of an exhaust turbocharger (11), wherein the at least one SCR catalyst element (31) is arranged on or in the exhaust line (29) upstream of the at least one exhaust turbine (42), as viewed in a direction of flow of the exhaust gas,
wherein the exhaust line (29) has at least one oxidation catalyst element (41), and
wherein the at least one SCR catalyst element (31) and the at least one oxidation catalyst element (41) are formed by a single catalyst element, wherein a substrate of the single catalyst element is coated with a catalyst material which has both a nitrogen-oxide-reducing and an oxidizing effect.

13. A stationary cogeneration unit and/or vehicle, having the apparatus according to claim 12.

* * * * *